Dec. 1, 1964   R. T. HAAG   3,159,378
SEALING CONSTRUCTION FOR PISTON VALVE
Filed Aug. 31, 1961   2 Sheets-Sheet 1

INVENTOR.
ROBERT T. HAAG
BY *Ely, Frye & Hamilton*
ATTORNEYS

INVENTOR.
ROBERT T. HAAG
BY Ely, Frye & Hamilton
ATTORNEYS

United States Patent Office 3,159,378
Patented Dec. 1, 1964

3,159,378
SEALING CONSTRUCTION FOR PISTON VALVE
Robert T. Haag, Mansfield, Ohio, assignor to Shafer Valve Company, Mansfield, Ohio, a corporation of Ohio
Filed Aug. 31, 1961, Ser. No. 135,271
1 Claim. (Cl. 251—325)

The invention relates to piston type valves for pipe lines carrying high pressures, and more particularly to an improved arrangement of O-ring seals for a piston type valve.

In certain prior piston valves lubricant seals were provided in the piston surrounding the valve ports in the body in the closed position of the valve, and in some cases the seals also surrounded the valve port in the piston. In such constructions the lubricant is blown out of those portions of the lubricant sealing groove which pass over the body port during opening and closing, and the lubricant must be continuously replaced.

Permanent gaskets, such as O-rings, have been proposed in similar arrangements but these tend to be blown out of their grooves, especially under high pressures, and are subjected to wear and damage each time the rings cross the valve port. Certain other constructions have provided O-rings encircling the piston on each side of the piston port, but in such case at least one of the rings passes over the body port during opening and closing and is subject to blowout and wear. Moreover, there is no seal around the piston between the inlet and outlet body ports.

Further damage is occasioned to one of the O-rings as it passes over that area of the body between the body port and the piston port in closed position on the outlet side of the body because that area is subjected to wear or scouring by pipe line fluid as the piston port passes over that area during the opening and closing of the valve.

It is, therefore, an object of the present invention to provide an improved piston valve construction having a novel O-ring arrangement which overcomes the foregoing disadvantages of prior constructions.

More specifically, it is an object of the present invention to provide an improved piston valve sealing construction employing an O-ring inclined angularly to the axis of the piston.

It is a further object of the present invention to provide an improved piston valve sealing valve construction which utilizes only one encircling O-ring intermediate the ends of the piston to effectively seal the inlet body port both to prevent leakage through to the outlet port and inadvertent travel of the piston when the valve is closed.

It is a still further object of the present invention to provide an improved piston valve sealing construction employing a stretched angularly inclined O-ring so as to eliminate the undue wearing and scoring of the O-ring as it moves past the inlet body port.

These and other objects which will become apparent in the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claim and not by the details of the specification.

Figure 1:
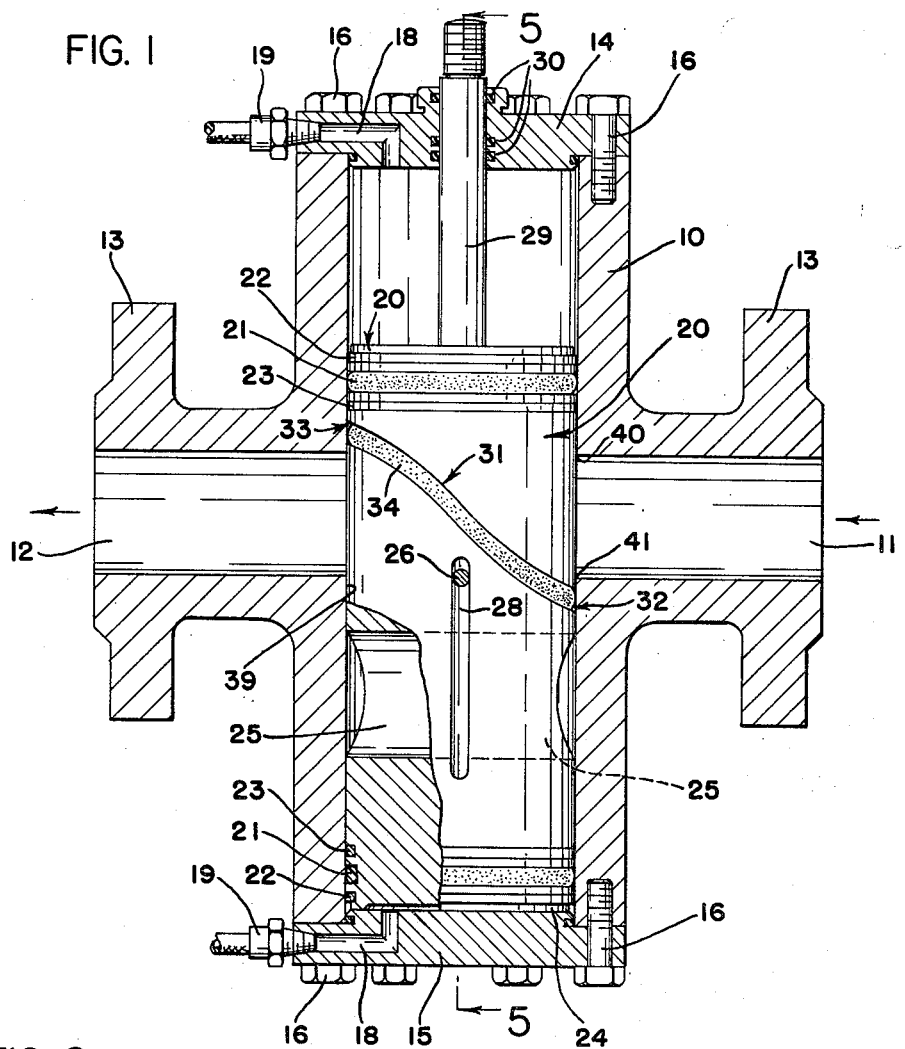
FIG. 1 is a vertical sectional view of the improved piston valve in closed position, the piston being shown in elevation and partly broken away.
Figure 2:
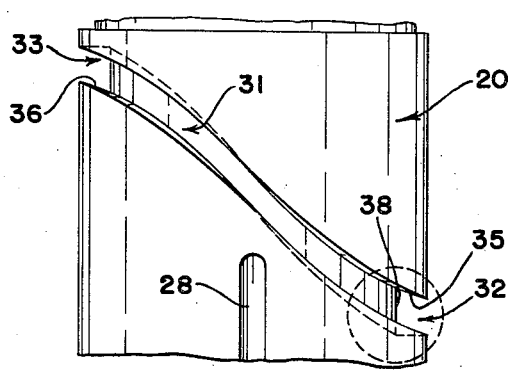
FIG. 2 is an enlarged fragmentary area of the piston shown in FIG. 1, depicting the angularly inclined peripheral groove for a stretched O-ring according to the present invention.

The housing or body of the improved piston valve is indicated at 10 and is cylindrical in form having opposed registering fluid ports, 11 being designated the inlet port and 12 the outlet port. The walls forming the ports 11 and 12 preferably have flanges 13 at their outer ends to make the usual flanged connections with the pipe line.

The body 10 has removable end plates 14 and 15 secured thereto by screw studs 16 and each end plate has an L shaped port 18 fitted with a fluid pressure connection 19 for supplying and exhausting fluid pressure alternately to opposite ends of the body to reciprocate the piston therein to open and closed positions.

The piston which is reciprocal in the body 10 is indicated generally at 20 and is provided at each end with a plurality of gaskets. In the embodiment depicted there are three gaskets at each end. The middle gasket is shown as an O-ring 21 which acts as a sealing ring and the outer and inner rings 22 and 23 act as wiper rings. The portion 24 of piston 20 axially outward of ring 22 has a reduced diameter which relieves the pressure buildup between wiper ring 22 and sealing ring 21, thus prolonging the life of the sealing ring.

Figures 4, 5:
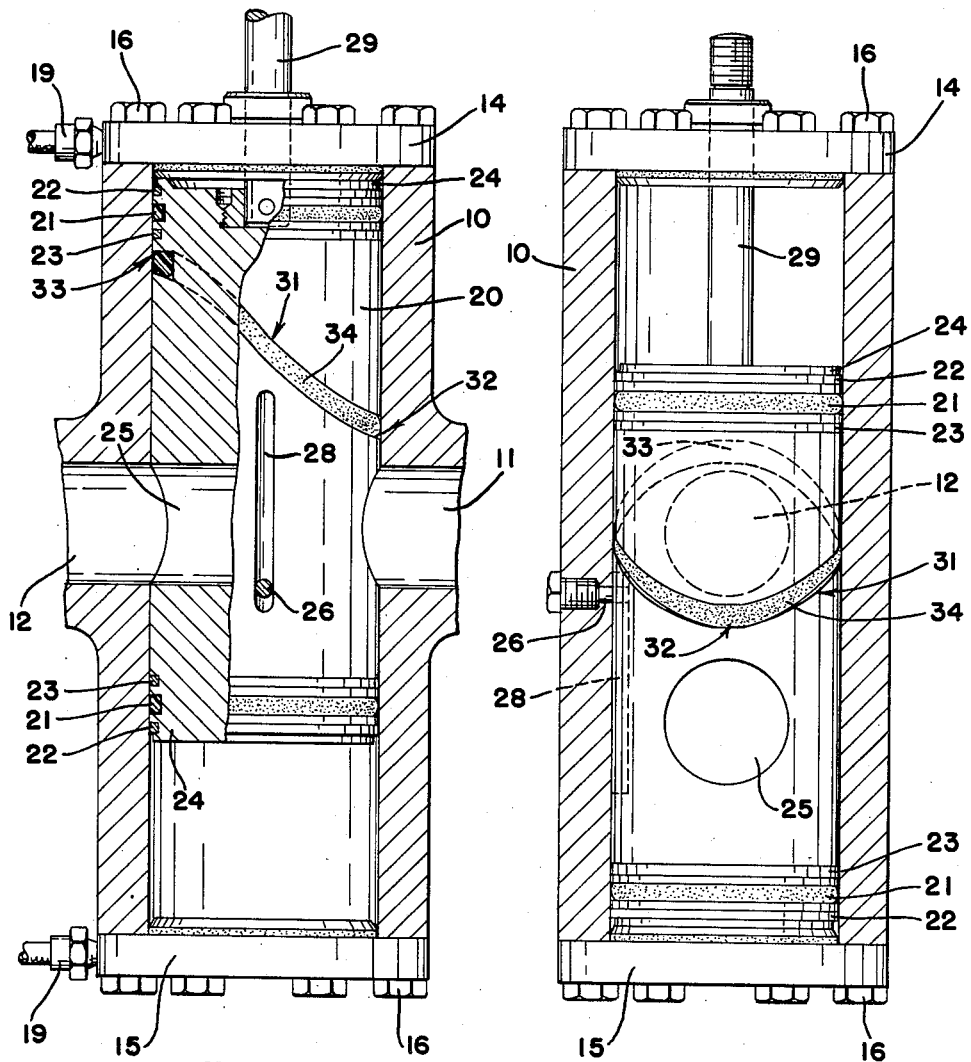
FIG. 4 is a fragmentary sectional view similar to FIG. 1 showing the piston in full open position.
FIG. 5 is a cross-sectional view taken substantially on line 5—5 of FIG. 1 showing the piston in elevation.

The piston is provided between its ends with a through port 25 the same size as the ports 11 and 12 in the body, and adapted to register with said ports when the piston is in full open position, as in FIG. 4. As shown, the port 25 is substantially nearer to the bottom end of the piston than to the top, for a purpose to be described.

A means is provided for preventing axial rotation of the piston 20 as it reciprocates, and preferably comprises a screw stud 26 extending through the body 10, preferably at 90° to the ports 11 and 12 and slidably received in a vertical groove 28 in the exterior of the piston wall, to allow vertical movement of the piston from fully open to fully closed position. A shaft 29 is attached to the upper end of the piston 20 and extends outwardly through the top plate 14 of the cylinder with suitable O-rings 30 around the shaft. While the amount of this shaft which projects visually indicates the position of the piston valve, it may also be provided with suitable gripping means, not shown, to allow manual operation of the valve when desired.

Between the through port 25 and the top of the piston 20, a groove 31 peripherally engirdles piston 20. Groove 31 is angularly inclined with respect to the longitudinal axis of the piston and is oriented such that when the piston is in closed position, as shown in FIG. 1, the portion 32 of the groove comprising the longitudinal extremity of the groove closest to the through port 25 passes between the through port 25 and the inlet port 11, and the portion 33 of the groove comprising the longitudinal extremity furthest from through port 25 passes on the far side of said outlet port 12 opposite to the through port 25. The diagonally disposed groove 31 is recessed to receive an O-ring 34 therein and is, therefore, preferably generally rectilinear in cross section through most of its length.

Figure 3:
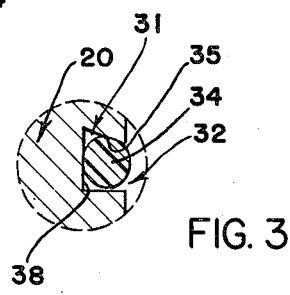
FIG. 3 is a cross-sectional view in the fragmentary area indicated by the broken line circle in FIG. 2.

However, portion 32 in particular and also preferably portion 33 have undercut surfaces 35 and 36, respectively, on the engaging side of the groove. Surfaces 35 and 36 are termed the engaging sides of the groove because the O-ring 34 is made to have a lesser circumference than the peripheral length of groove 31 and when it is stretched into position in groove 31 it tends to contract against engaging surfaces 35 and 36 because they are the axially inner surfaces with respect to the longitudinal axis of the piston. As is particularly apparent in FIG. 3, the stretched condition of O-ring 34 also causes it to contract against the base 38 of groove 31 as well.

The unique disposition and configuration of groove 31, together with the cooperatingly stretched O-ring 34, effects a complete seal between the inlet port 11 and the outlet port 12 when the piston 20 is in closed position and also prevents the fluid from seeping into or beyond the through port 25. This configuration also dispenses with the necessity of requiring a multiplicity of rings to seal the inlet from the outlet port or of requiring a sealing ring to ride over or be required to seal against the body wear area, indicated generally by the numeral 39. The wear area 39 is that portion of the inner surface of the outlet side of the cylinder extending between the outlet port 12 and the outlet end of the piston through port 25 in the closed position of the piston.

As the piston 20 is moved between open and closed positions, this area 39 is subjected to the wearing or scouring action of the pressure fluid passing through the partly opened through port 25 and striking the cylinder wall at the outlet end of port 25. This area 39 thus becomes scored and abraded and hence it is difficult to maintain a seal against such an irregular surface and, furthermore, this difficulty is compounded if a sealing ring is moved across such a surface and becomes damaged to the extent of detracting from its effectiveness as a seal. The abusive wear formerly incident to the moving of a sealing ring past a port, as when ring 24 moves past the inlet port 11, in the presence of high line pressure tending to blow sealing means out of their recesses, has been obviated by stretching the O-ring 34 into its unique receiving groove 31.

Furthermore, in the unique construction disclosed herein the ring 34 is not required to move across outlet port 12, and on the inlet side the force of the high pressure of the fluid from inlet port 11 serves to augment the effect of stretched O-ring 34 by assisting in retaining the O-ring partially beneath the undercut surface 35, thus preventing the pressure from rolling the ring 34 out of its reccess.

Furthermore, the high line pressure assists in the prevention of injury when the stretched O-ring 34 moves past the upper edge 40 of inlet port 11 as the piston is moving to open position. The configuration of groove portion 32 permits the ring 34 to roll against the moving piston 20 while the high pressure tends to seat the O-ring in the apex of the groove between base 38 and engaging surface 35, so as to prevent abrasion of the O-ring material.

When the stretched O-ring 34 moves past the lower edge 41 of inlet port 11, the configuration of the grooved portions 32 together with the high line pressure compresses the O-ring 34 into the available space within the apex between base 38 and undercut engaging surface 35 to prevent damaging abrasion to the sealing ring. The angular inclination of the surface 35, about 22½° undercut being most efficient, facilitates this abrasion-saving compression substantially more than a surface perpendicularly disposed to the side walls of the valve body.

It is therefore readily apparent that a piston valve sealing arrangement according to the present invention is extremely advantageous over the prior art both as to complexity and efficiency.

What is claimed is:

In a piston valve having a body provided with aligned inlet and outlet ports and a reciprocable piston having a through port registrable with said inlet and outlet ports when the piston is moved from closed to open position, a groove in said piston, said groove peripherally encircling said piston in inclined relation to the longitudinal axis of said piston, said groove being so oriented with respect to the longitudinal dimension of said piston that when said piston is in closed position a first longitudinal extremity of said groove is positioned between said body inlet port and said piston through port and a second longitudinal extremity of said groove is positioned on the other side of said body outlet port, undercut surfaces on the side of the longitudinal extremities of said groove closest to the longitudinal axis of said body ports when the piston is in closed position, and a stretched O-ring seated in said groove.

References Cited in the file of this patent

UNITED STATES PATENTS

| | | |
|---|---|---|
| 1,153,973 | Tacit et al. | Sept. 21, 1915 |
| 2,631,002 | Mueller | Mar. 10, 1953 |
| 2,704,650 | Rand | Mar. 22, 1955 |
| 2,923,310 | Eckert | Feb. 2, 1960 |
| 3,048,191 | Crang | Aug. 7, 1962 |

FOREIGN PATENTS

| | | |
|---|---|---|
| 409,308 | Germany | Feb. 3, 1925 |
| 494,708 | Italy | May 29, 1954 |
| 879,570 | Great Britain | Oct. 11, 1961 |